Nov. 20, 1962   J. J. SHADA   3,064,760
LIQUID MIST GENERATING DEVICE
Filed Feb. 20, 1959   3 Sheets-Sheet 3

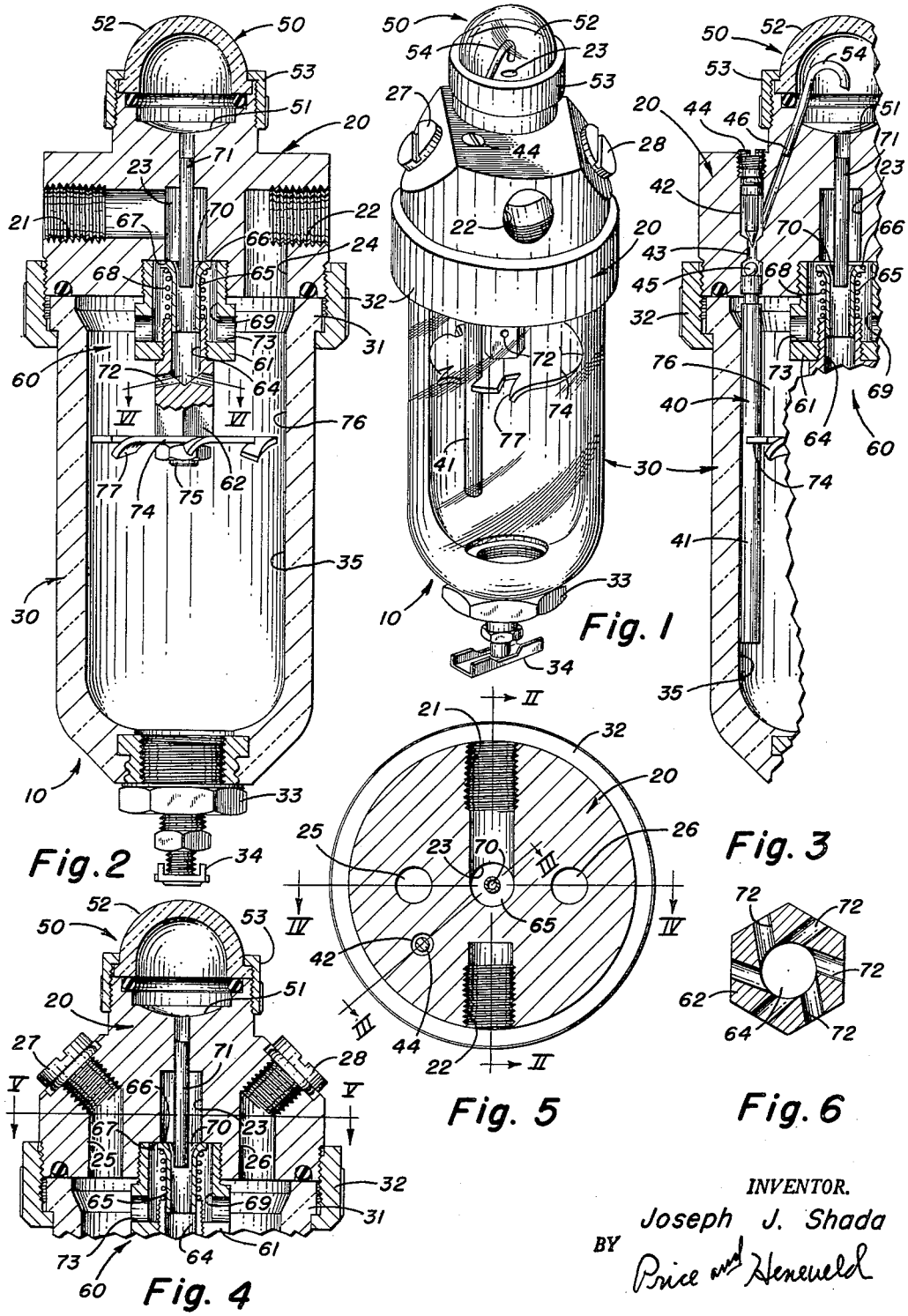

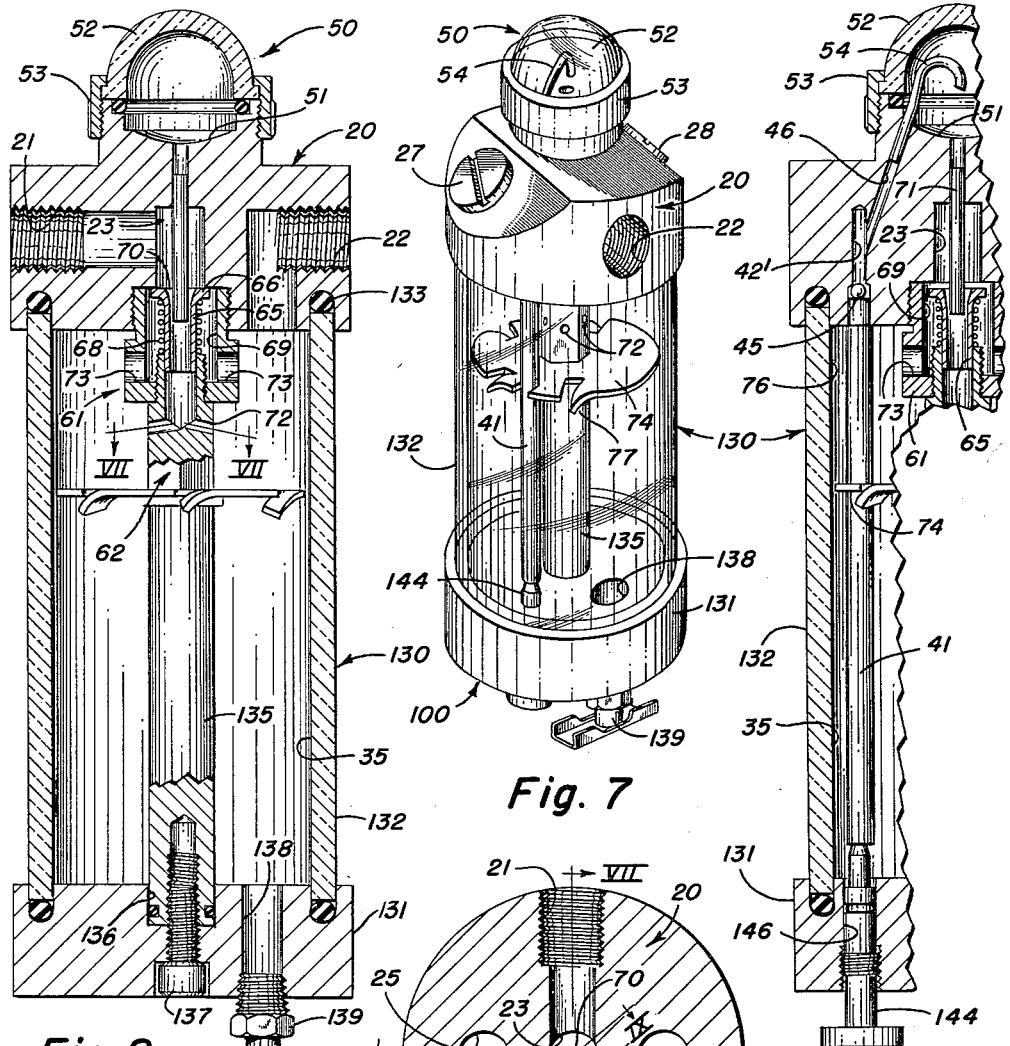
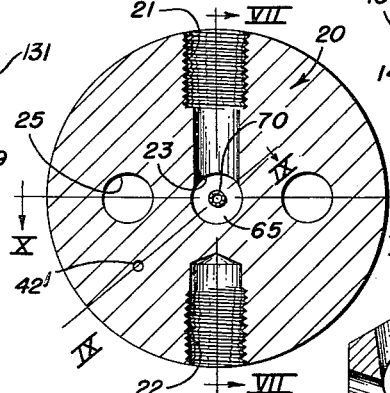

INVENTOR.
JOSEPH J. SHADA
BY Price & Heneveld
ATTORNEYS

United States Patent Office 3,064,760
Patented Nov. 20, 1962

3,064,760
LIQUID MIST GENERATING DEVICE
Joseph J. Shada, Grand Rapids, Mich., assignor to The Bellows Co., Akron, Ohio, a corporation of Ohio
Filed Feb. 20, 1959, Ser. No. 794,705
12 Claims. (Cl. 184—55)

This invention relates to aerators and liquid atomizers, in general, and has particular application to liquid mist generators having flow compensating means of self-adjustment.

There is considerable need, in many fields of endeavor, for suitable means of generating a liquid mist in a field of air or gas. For example, liquid insecticides are more suitably used when they are vaporized or broken into tiny droplets and uniformly distributed by means of a forced air or gas carrier. Similarly, a liquid anti-freeze solution may be combined with a gas to prevent freeze-up, by means of suitable atomizing or aerating means.

One particularly significant use for means of generating a liquid mist is with pneumatic tools which have air powered parts that require continuous lubrication, while in operation. These pneumatic tools may differ in size from miniature air turbines, to power high speed dental air drills or the like, to large multiple horsepower air turbines or other air powered devices. Each has air powered parts which require lubrication. In many instances they are unable to make use of conventional lubrication means because of their size, their use, or for some other reason.

The air powered dentist's drill is a very good example of a small pneumatic tool which requires continuous lubrication of its air powered parts and yet cannot make use of other lubrication means because of its size and its use. The air powered dentist's drill usually has a wide range of operating speeds which dictates different lubricating requirements at different operating speeds. Increased operating speeds require a larger volume of compressed air to operate the pneumatic tool faster. A proportionate increase in the amount of lubricant supplied is necessary to offset the increased friction at the higher operating speeds. However, the amount of lubricant supplied for high speed operation is not suitable at lower operating speeds since it will flood the operating parts and possibly cause excess lubricant to be expelled with the exhaust air. At the same time, the air supply source can not be unduly hindered, in providing some regulatory means of supplying lubricant, or the expectant speeds of the air powered device will not be attainable.

It is an object of this invention to disclose a compact, efficient and small size pneumatic liquid atomizer suitable for numerous uses, including those mentioned and others.

It is also an object of this invention to disclose a liquid mist generator which includes means for regulating the amount of liquid injected into the passing air or gas flow stream.

Another object of this invention is to disclose an aerator, or atomizer, having self-regulatory means for controlling the amount of liquid passing into the air or gas flow stream. Such means provides a greater or lesser liquid to gas ratio as best suits.

Still another object of this invention is to disclose self-regulatory means of controlling the liquid to gas ratio which are variable to suit the requirements of different devices making use thereof, and which are responsive to the gas flow condition.

A further object of this invention is to disclose an atomizer or aerator having more than one area within which liquid and gas may be combined to form a gas propelled liquid mist.

A still further object of this invention is to disclose a liquid mist generator, as just mentioned, having means of diverting or bypassing a part of the propellant gas around one of the liquid supply sources.

An even further object of this invention is to disclose means of bypassing the gas propellant which is responsive to the pressure condition of the gas flow.

Another and still further object of this invention is to disclose a liquid mist generator in which all of the propellant gas passes through one or more liquid supplying areas of the generator before passing therefrom.

As will be shown, this invention discloses an aerator which will supply an increasingly greater proportion of liquid into a passing air or gas flow stream, up to a certain amount, and thereafter a decreasingly proportionate amount in accord with the operating requirements of the pneumatic device with which used.

These and other objects and advantages in the practice of this invention will be more apparent in the illustration and description of a working embodiment of the invention. For such purpose an air line lubricator is shown by the drawings and is hereinafter described. Such illustration and description is not intended to limit the invention to such an application alone. As previously mentioned this invention has application in many other fields of endeavor.

In the drawings:

FIG. 1 is a perspective view of an air line lubricator including the features of this invention.

FIG. 2 is an enlarged cross sectional elevation of the air line lubricator, shown by FIG. 1, taken in the plane of line II—II of FIG. 5.

FIG. 3 is a partial and enlarged cross sectional elevation of the air line lubricator of FIG. 1, taken in a plane of line III—III of FIG. 5.

FIG. 4 is a partial and enlarged cross sectional elevation of the top part of the air line lubricator of FIG. 1, as seen in the plane of line IV—IV of FIG. 5.

FIG. 5 is a cross sectional plan view of the air line lubricator of FIG. 1 as seen in the plane of line V—V of FIG. 4.

FIG. 6 is an enlarged cross sectional plan view of part of the air line lubricator of this invention, as seen in the plane of line VI—VI of FIG. 2.

FIG. 7 is a perspective view of a modified form of air line lubricator including the features of this invention.

FIG. 8 is an enlarged cross sectional elevation of the air line lubricator, shown by FIG. 7, taken in the plane of line VIII—VIII of FIG. 11.

FIG. 9 is a partial and enlarged cross sectional elevation of the air line lubricator of FIG. 7, taken in a plane of line IX—IX of FIG. 11.

FIG. 10 is a partial and enlarged cross sectional elevation of the top part of the air line lubricator of FIG. 7, as seen in the plane of line X—X of FIG. 11.

FIG. 11 is a cross sectional plan view of the air line lubricator of FIG. 7 as seen in the plane of line XI—XI of Fig. 10.

FIG. 12 is an enlarged cross sectional plan view of part of the air line lubricator of this invention, as seen in the plane of line XII—XII of FIG. 8.

Figure 13:
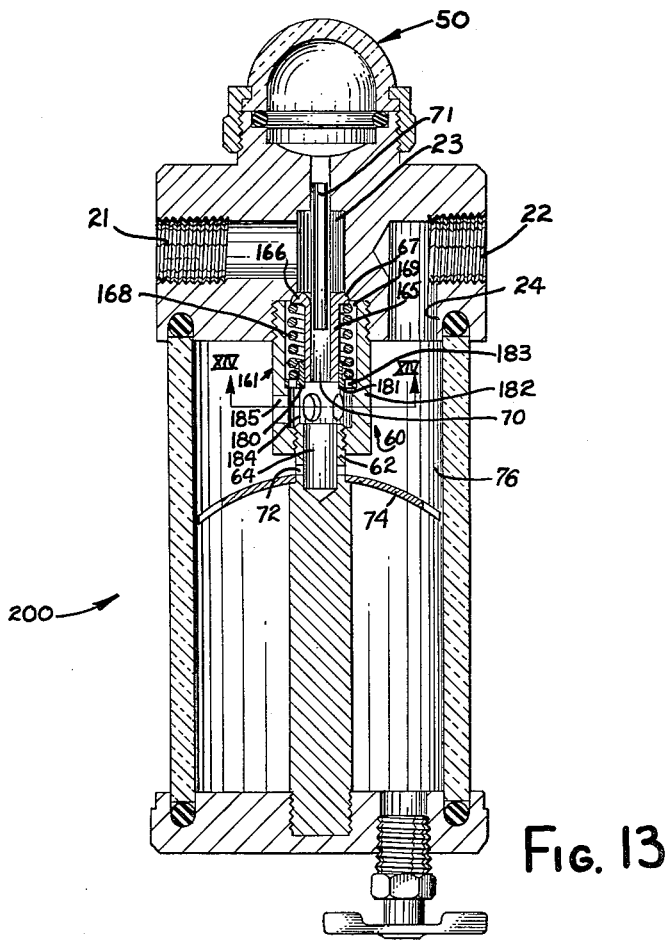
FIG. 13 is a cross sectional elevation of another modified form of air line lubricator including the features of this invention.

The aerator devices hereinafter disclosed include the features of this invention. They each comprise a passage member having a liquid reservoir engaged thereto. Gas or other aeriform fluid inlet and outlet passages are formed in the passage member and are aligned across the passage member but are not in direct communication. The flow passages for the aeriform fluid are in communication only through the liquid reservoir chamber space to which both separately connect.

The inlet passage for the aeriform fluid is in terminal communication with a passage formed centrally through the passage member. A regulated supply of liquid is drawn from the liquid reservoir chamber to the upper end of this centrally disposed passage. Within the lower end of the central inlet flow passage, and extending within the liquid reservoir, is a sub-assembly of parts which provides for the admixture of the aeriform fluid and liquid and the diversion of part of the gas or air, under certain operating conditions, around the primary source of the fogging liquid.

The sub-assembly just mentioned is shown as including a passage member extension having a flow nozzle responsive to pressure and flow conditions for opening or closing bypass means therearound. With the bypass means closed, the air or gas flows through the nozzle, picking up a regulated supply of liquid, and is exhausted into the reservoir chamber, in the form of a mist or mixture of gas and liquid, by certain turbulating means. The smaller, and therefore lighter, liquid droplets are held in suspension and carried on through the outlet passage while the heavier and larger droplets fall out and return to the liquid source. When the bypass means is open, a part of the air or gas passes directly into the reservoir chamber where it is mixed and combines with the gas and liquid mixture generated at the flow nozzle. An increase in gas flow or pressure is thus automatically compensated for without creating additional back pressure and without passing non-liquid carrying gas or air directly into the pneumatic system downstream.

Referring to the drawings in further detail:

The air line lubricator 10 of FIGS. 1–6 includes a passage member 20 having a reservoir member 30 engaged thereto. The reservoir member 30 is preferably of a transparent material to enable visual inspection of the lubricant supply carried therein.

Lubricant supply means 40 are provided between the reservoir member 30 and the passage member 20. The supply means 40 assures a regulated amount of lubricant within a visual supply chamber 50 provided on the passage member. The supply chamber 50 communicates with the mixture control means 60 which is connected to the passage member 20 and extends within the reservoir member 30.

The passage member 20 includes air inlet and outlet passages 21 and 22, respectively, which are aligned across the passage member but do not communicate therethrough. The air inlet passage 21 is in terminal communication with a passage 23 formed centrally through the passage member 20. The passage 23 communicates with the supply chamber 50 and with the reservoir 30. A separate passage 24 is formed through the reservoir face of the passage member 20 for communication between the reservoir space and the outlet passage 22.

Passages 25 and 26 are provided through the passage member 20 for supplying lubricant to the reservoir member 30 and providing an air bleed passage. These passages are closed by threaded plugs 27 and 28 received in their outer ends.

The reservoir member 30 is shown as a cup or bowl shaped member secured to the underside of the passage member 20. The reservoir member 30 includes a flange 31 about its upper edge. The flange 31 is held engaged to an O-ring seal of the passage member by a coupling collar 32 threaded on the lower end of the passage member. A drain valve assembly 33 is mounted in the base of the reservoir member and includes a drain plug 34. The reservoir member 30 thus provides a closed reservoir chamber 35 for lubricant. The lubricant level is visible through the transparent lubricant member 30 and may be evidenced by visual markings thereon.

The lubricant supply means 40 includes a flow conduit 41 which is engaged within a passage 42 formed through the passage member 20. The passage 42 is disposed in parallel spaced relation to the central passage 23 and near the side of the reservoir member 30. The flow conduit 41 extends into the reservoir space 35 to near the bottom thereof.

The supply passage 42 includes a narrow necked passageway 43 intermediate its ends. An adjustable needle valve 44 is provided within the upper end of the passage 42 and has the needle nose thereof extended within the passageway 43. A ball check valve 45 is provided in the lower end of passage 42 between the passageway 43 and the flow conduit 41. A passage 46 extends through the passage member 20 from the passageway 42 to the supply chamber 50.

The supply chamber 50 includes a recess 51 provided in the upper face of the passage member 20 and closed by a transparent dome shaped sight glass member 52. The sight glass member 52 is seated on an O-ring seal and is held in place by a collar member 53 in threaded engagement with the passage member 20. A gooseneck conduit 54 is engaged in the passage 46 and extends up and over the dished out base of the recess 51. The passage 23 communicates with the supply chamber 50 centrally of the recess 51.

The mixture control means 60 includes a bypass fitting 61 and a through flow fitting 62 engaged together and secured to the reservoir face of the passage member 20. The reservoir end of passage 23 is enlarged to receive the fitting 61 in threaded internal engagement therewith. The through flow fitting 62 is received in threaded engagement through the lower end of fitting 61.

The through flow fitting 62 is formed to include a blind end passage or chamber space 64 in aligned relation to passage 23. A sleeve or valve member 65 is reciprocal within the passage or chamber space 64. The sleeve member 65 includes a flanged head 66 held in valve forming engagement with an internal shoulder 67 provided in passage 23. A biasing spring 68 is provided about the sleeve member 65 between its flanged head 66 and the end of the through flow fitting 62.

The bypass fitting 61 includes an enlarged passageway 69 within which the valve member 65 is disposed. The passageway 69 is annular with the valve closed and communicates with the central flow passage 23 only when the valve 65 is opened against the resistance of spring 68.

The sleeve member 65 forms a flow nozzle 70 for the through flow of air line air. A lubricant supply conduit 71 is fitted within the supply chamber communicating end of passage 23 and extends to within the throat of the flow nozzle 70. Air passing through nozzle 70 is received in the blind end passage or chamber space 64 with lubricant from the supply conduit 71.

Through flow air and lubricant are exhausted from the chamber space 64 through depending tangentially disposed exhaust ports 72 through the sides of the through flow fitting 62. The fitting 62, in this instance, is hexagonal in shape and has the exhaust ports 72 arranged to extend one through each facet thereof. The tangential exhaust arrangement assures a swirl or turbulence of the air and lubricant within the reservoir space 35. This, in turn, provides a better mixing of the air and lubricant as well as a centrifuge effect to separate out larger droplets of lubricant which will not remain in suspension. The exhaust ports 72 are extended downwardly from the reservoir face of the passage member 20 to prevent lubricant from collecting thereon or on the bypass fitting 61.

The bypass fitting 61 includes exhaust ports 73 which communicate with the annular passageway 69.

Air line air received from the passage 23, through the valve 65 when open, and into the bypass passageway 69, will be exhausted through ports 73 into the reservoir chamber space 35. The bypassed air will be mixed with the through flow air and lubricant in the reservoir space 35 prior to the exhaust of both through the outlet passage 24 and port 22.

A baffle plate 74 is secured to the end of the through flow fitting 62 by a bolt fastener 75. The baffle plate 74 extends across the reservoir chamber space 35 and forms a mixing space 76 at the upper end thereof. Peripheral parts 77 of the baffle plate 74 are bent down for the return flow of non-suspended lubricant back to the lubricant sump of the reservoir member. Lubricant may also return to the sump area down the side walls of the reservoir space defining bowl.

*Modification*

Before describing the operation of the lubricator 10, the structure of another lubricator 100, having certain modifications, should be understood.

The lubricator 100 is shown by FIGS. 7-12. Such structure in lubricator 100 as is essentially the same as in lubricator 10 is identified by the same numerals.

The lubricator 100 includes the passage member 20 (with but slight modification) and a reservoir portion 130. The reservoir portion 130 is formed by a base member 131 secured in fixed spaced and axially aligned relation to the passage member and having a transparent sleeve 132 received therebetween. The sleeve member 132 is engaged with O-ring seals in annular grooves 133 and 134 provided in the passage and base members 20 and 131, respectively. The base member 131 is held to the passage member 20 by a stud 135 which includes the through flow fitting 62 at its upper end, in turn engaged through the bypass fitting 61 to the passage member. The lower end of the stud 135 is received within a shouldered passage 136 and is held by a threaded bolt fastener 137 received through the bottom of the base member 131 and into engagement therewith.

A drain passage 138 is provided through the base member and is closed by a drain plug 139.

The lubricant supply passage 42 of the lubricator 10 is modified in the lubricator 100 and is designated 42'. The supply passage 42' does not extend through the passage member 20 but is a blind end passage with the supply chamber passage 46 intersecting it near the blind end.

An adjustable needle valve 144 is provided within a passage 146, through the base member 131. The end of the valve 144 extends within the depending end of the supply conduit 41 and varies the flow of lubricant permitted therethrough.

*Operation*

Both of the lubricators 10 and 100 operate in substantially the same manner. Therefore the operation will be described with respect to the lubricator 10, first disclosed.

The air line lubricator 10, assembled as described and as shown in FIGS. 1-6, is connected within an air supply line, to a pneumatic tool, with the inlet port 21 receiving the forced air supply, and the outlet port 22 connected to the downstream side of the air supply line.

Air received through the inlet port 21 passes directly into the passage 23 and flows through the flow nozzle 70 and over the end of the lubricant supply conduit 71. This creates a suction force at the lower end of the lubricant supply conduit 71 tending to draw lubricant from the chamber space 50. In turn, a lower pressure area is created within the chamber space 50 which tends to draw lubricant through the supply means 40.

Lubricant is drawn up from the reservoir sump through the supply conduit 41, past the one-way ball check valve 45, through the needle valve regulated passageway 43, through passage 46 and conduit 54, into the chamber space 50. This flow of lubricant through the supply means 40 is further assisted by the greater pressure area created in the mixing space 76 and over the lubricant in the reservoir sump.

The air flow through nozzle 70 carries with it a predetermined and regulated amount of lubricant, per volume of air, into the blind end chamber space 64. Here the air and lubricant are dashed against the end of the chamber and are then diverted, together, radially outward, through the exhaust ports 72. The fine and lightweight droplets of lubricant are suspended in the exhaust air as a fine mist or fog. The heavier particles of lubricant, not capable of remaining in suspension, are thrown out and downwardly against the wall of the reservoir space 35. Such particles collect on the baffle plate 74 and the reservoir walls and flow back into the lubricant collecting sump of the reservoir 30.

The incoming air forces the lubricant saturated air from the mixing space 76 and through the outlet passage 24 and port 22.

By reason of the valve member 65 this lubricator is adaptable for use in supplying high or low air volume requirements. In low volume flow all the air flows through the throat 70. However, in high volume flow the pressure in throat 70 is sufficient to overcome the biasing force of the spring 68 causing the nozzle forming sleeve or valve member 65 to be retracted to open the bypass passageway 69. In such instances the incoming air flows both through the nozzle 70, and through the bypass passage 69 and outlet ports 73. The air which has not passed through the flow nozzle 70 is received in the mixing space 76 unsaturated with lubricant. However, the turbulence within the mixing space 76, caused by the saturated air flow through the turbulating ports 72, causes the unsaturated air to immediately receive some lubricant in suspension therewith.

The extent to which the air leaving the lubricators 10 or 100 is saturated, when the bypass fitting 61 is in use, will depend upon what prior adjustment has been made in the lubricant supply means 40. If the lubricant supply within the chamber space 64 is such as causes practically all lubricant to be carried into suspension then the bypass flow will dilute the saturated air. If the lubricant supply is such as causes excess lubricant then the bypass flow will carry some or all of the excess lubricant, of suspendible size, into suspension. Accordingly, the mixture control means 60 is a saturation control in and of itself and further, is a self-regulating adjustment responsive to air pressures over a certain amount. The opening of valve member 65 will be greater or less depending on the upstream air pressure. The responsiveness of the valve may also be made to suit different operating conditions by the use of different biasing springs 68.

*Modification*

Air lubricators 10 and 100 function quite satisfactorily throughout the range of normally encountered low volume flow to moderately high volume flow of air therethrough. However, above moderately high volume flow rates, there is a tendency for air bypassed through the passage 69 and exhausted therefrom through the outlet ports 73 to pass through the mixing space 76 to the outlet passage 24 without receiving an adequate quantity of suspended lubricant. Apparently, at these high flow rates, laminar flow of the bypassed air occurs. This problem is avoided by the air lubricator 200 of FIGS. 13 and 14.

The air line lubricator 200 comprises the same basic structural elements as air line lubricator 100. The major difference, however, is that the mixture control means 60 is modified to admix the bypassed air with lubricant entrained air in the mixture control means rather than in the mixing space 76. In addition, the mixture control means 60 functions to disperse the bypassed air in admixture with lubricant entrained air throughout the mixing space 76 prior to its exhaust from the mixing space 76 through the outlet passage 24 and port 22.

In air line lubricator 200, the mixture control means 60 comprises a fitting 161 threadedly secured to the reservoir space of the passage member 20. The reservoir end of passage 23 is enlarged to receive the fitting 161 in threaded internal engagement therewith. At the end of the passage 23 there is provided a reciprocable valve member 165. Valve member 165 has a flanged head 166 normally held in valve-forming engagement with the internal shoulder 67 provided at the end of passage 23.

Figure 14:
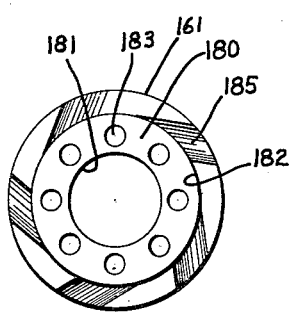
FIG. 14 is an enlarged cross sectional plan view of the central portion of the air line lubricator of FIG. 13 taken as along the plane of line XIV—XIV of FIG. 13 in the direction of the top thereof.

The bypass fitting 161 comprises an enlarged passageway 169 within which the valve member 165 is disposed. The passageway 169 is annular with the valve closed and communicates with the central flow passage 23 only when the valve member flange head 166 is displaced from the shoulder 67. Disposed within the passageway 169 is a helical, biasing spring 168, one end of which bears against the underside of the flange head 166. The other end of the biasing spring 168 bears against the collar 180 of a bushing 181. The collar 180, it will be observed, is seated on a shoulder portion 182 of the fitting 161 at the end of the passage 169. The collar 180, as shown in FIG. 14, comprises a plurality of orifices 183. In FIG. 13, it will be observed that the bottom portion of the valve member 165 is in sliding fit with the bushing 181.

Below the valve member 165 and in communication therewith, there is provided a chamber 184 within the fitting 161. Disposed through the fitting at an angle to the chamber 184 and in communication therewith are discharge ports 185.

The mixture control means 60 may also include a free flow fitting 62 threadedly secured to the lower end of the fitting 161 so that the blind end passage or chamber space 64 is in aligned relation to passage 23 as shown in FIG. 13. The angularly disposed exhaust ports 72 thereof should be disposed above the baffle plate 74. Such a fitting 62, however, as shown in FIG. 13, is not necessary in this modification in view of the fact that exhaust ports 185 have been provided.

The mixture control means 60 of the air line lubricator 200 functions in much the same manner as the mixture control means 60 of the air line lubricators 10 and 100. Thus, the flow of air through passage 21 and passage 23 into flow nozzle 70 formed by the valve member 165 causes lubricant to be drawn down from the chamber space 50 through the lubricant supply conduit 71 into the chamber 184. The lubricant entrained air is exhausted from the chamber 184 through the exhaust ports 185 into the mixing space 76. Because of the angular disposition of the exhaust ports 185, the exhausted lubricant entrained air is dispersed throughout the mixing space 76 prior to passage into the outlet passage 24 and port 22.

Under conditions of high volume flow rates of air through passage 21, the valve member 165 is caused to move downwardly against the force of the biasing spring 168. In so doing, engagement of the valve member 165 is guided by the bushing 181. Such movement of the valve member 165 opens the outer passage 169 to the central air flow passage 23 and thereby diverts the proper proportion of air flowing through the mixture control means 60 into the passage 169. The bypassed air flowing through passage 169 is exhausted therefrom through the orifices 183 into the chamber 184 whereupon it admixes with the lubricant entrained air emerging from the end of the flow nozzle 70 formed by the valve member 165. The mixture of bypassed air and lubricant entrained air is then expelled from the chamber 184 through exhaust ports 185 into the mixing space 76.

When the fitting 62 is used, a substantial portion of the lubricant entrained air will exhaust from the chamber 184 into the blind end chamber 64 and from there through exhaust port 72 into the mixing space 76. The remaining proportion of the lubricant entrained air exhausted from the chamber 184 through the exhaust ports 185 is sufficient, however, to mix with bypassed air and to furnish the bypassed air with an adequate concentration of atomized lubricant.

The mixture control means 60 of lubricator 200 has another advantage in that the combination of the bushing 181 and valve member 165 avoids binding of the valve member under operative conditions. In lubricators 10 and 100, binding can occur if the fitting 62 is not centered within rather narrow limits.

While a preferred embodiment of this invention and modifications thereof have been described, it will be understood that other modifications and improvements may be made thereto. Such of these modifications and improvements as incorporate the principles of this invention are to be considered as included in the hereinafter appended claims unless these claims by their language expressly state otherwise.

I claim:
1. Liquid mist generator means for use within an air line lubricator having a passage member, a reservoir member connected to said passage member and including a lubricant reservoir space, air inlet and outlet ports and passages formed in said passage member and connected to said reservoir space, and lubricant supply means provided between said reservoir space and said air inlet passage, said generator means comprising; a bypass passage forming fitting having through flow passage forming means engaged thereto, said bypass fitting being engageable within the reservoir end of said air inlet passage and extendible within said reservoir, said through flow fitting including a reciprocal flow nozzle member having a central passageway for passing a limited predetermined quantity of air and having an end normally held engaged with the outlet end of said air inlet passage and closing the bypass passage of said bypass fitting, and said flow nozzle being formed and disposed to respond to inlet air line pressure for opening said bypass passage and diverting part of the inlet air flow therethrough.

2. An air line lubricator, comprising; a passage member having a lubricant reservoir space forming member connected thereto, aligned indirectly communicating air inlet and outlet passages formed in said passage member, separate passage means formed in said passage member and connecting said inlet and outlet passages respectively to the reservoir space of said reservoir member, mixture control means connected to said passage member at the outlet end of said air inlet passage means, said control means extending within said reservoir space, lubricant supply means provided between the lubricant reservoir of said reservoir member and said mixture control means, said mixture control means including an air flow bypass passage forming fitting having a through flow passage providing member engaged thereto, said through flow passage providing member including a reservoir connected chamber and having a reciprocal sleeve member disposed to extend between said chamber and the outlet end of said air inlet passage, said sleeve member being disposed to close the bypass passage of said bypass fitting when engaged with the outlet end of said air inlet passage, said bypass passage connecting to said reservoir connected chamber, and said sleeve member being responsive to air line pressure upstream thereof for opening said bypass passage and diverting air line air therethrough into said reservoir space.

3. A liquid mist generator means for use within an air line lubricator having an air inlet passage and an air outlet passage comprising: a bypass passage means having a through flow passageway and communicating with said air inlet passage and air outlet passage; said bypass passage means including a reciprocal flow nozzle member having a central passageway for passing a limited predetermined quantity of air and having an end normally held engaged with the outlet end of said air inlet passage and closing the bypass passage of said bypass means; a stationary liquid supply tube projecting generally into said central passageway; and said flow nozzle being formed and disposed to respond to the pressure in the inlet air line passage for opening said bypass passage and diverting part of the inlet air flow therethrough and simultaneously moved over said tube to vary the flow area around said tube in said passageway.

4. A liquid mist generator comprising: an air and liquid mixture means; a passage member with inlet and outlet passageways communicating through the air and liquid mixture means; liquid supply means for supplying liquid to said air and liquid mixture means; said air and liquid mixture means including a valve member having a central passageway therethrough and having one end seated on and encompassing the inlet passageway for directing limited flow of air through said central passageway; a stationary liquid supply means projecting generally into said central passageway; and said valve member being biased to seated position and reciprocally movable responsive to a predetermined pressure to unseat said one end from the inlet passageway permitting flow of air around said valve member and to simultaneously move over said liquid supply means thereby varying the flow area around said tube through said central passageway.

5. A liquid mist generator, comprising: a passage member having a liquid reservoir space forming member connected thereto, indirectly communicating air inlet and outlet passages formed in said passage member, separate passage means formed in said passage member and connecting said inlet and outlet passages respectively to the reservoir space of said reservoir member, air and liquid mixture means located at the outlet end of the passage means which connects said air inlet passage with said reservoir space, said mixture means extending within said reservoir space, liquid supply means provided to supply liquid from said reservoir member to said mixture means, a portion of said sepaarte passage means also comprising a shifting pressure responsive sleeve valve adjacent the outlet end of the passage means; and said valve element below a predetermined air inlet pressure permitting only a limited supply of air to pass through said mixture means and above said predetermined pressure permitting a substantially greater supply of air to pass through said mixture means.

6. A liquid mist generator, comprising: a passage member having a liquid reservoir space forming member connected thereto; indirectly communicating air inlet and outlet passages formed in said passage member, separate passage means formed in said passage member and connecting said inlet and outlet passages respectively to the reservoir space of said reservoir member, air and liquid mixture means located at the outlet end of the passage means which connects said air inlet passage means with said reservoir space, said mixture means extending within said reservoir space, liquid supply means provided to supply liquid from the liquid reservoir to said reservoir member of said reservoir member to said mixture means, and a pressure responsive valve element provided at the outlet end of the passage means which connects said air inlet with said reservoir space, said valve element below a predetermined air inlet pressure permitting only a limited supply of air to pass through said mixture means and above said predetermined pressure permitting a substantially greater supply of air to pass through said mixture means, said pressure responsive valve element being a reciprocating element having a central passageway therethrough and one end seated on and encompassing the outlet end of the passage means which connects the inlet passage with the reservoir; said valve element being biased to seated position and reciprocally movable off said seated position in response to pressures above said predetermined pressure; said liquid supply means being a tube communicating with said liquid reservoir and concentrically located inside the central passageway of said reciprocating element.

7. A liquid mist generator, comprising: a passage member having a liquid reservoir space forming member connected thereto, indirectly communicating air inlet and outlet passages formed in said passage member, separate passage means formed in said passage member and connecting said inlet and outlet passages respectively to the reservoir space of said reservoir member, air and liquid mixture means connected to said passage member at the outlet end of the passage means which connects said air inlet passage with said reservoir space, said mixture means extending within said reservoir space and including a mixing chamber and a mixture-promoting airflow-directing means associated with said mixing chamber, liquid supply means provided to supply liquid from the liquid reservoir of said reservoir member to said mixture means, said mixture means including an air flow bypass passage forming fitting having a through-flow passage providing member engaged thereto, said through-flow passage providing member including a reservoir connected chamber and having a reciprocal sleeve member disposed to extend between said chamber and the outlet end of said air inlet passage, said sleeve member being disposed to close the bypass passage of said bypass fitting when engaged with the outlet end of said air inlet passage, said bypass passage connecting to said reservoir space, said sleeve member being responsive to air line pressure upstream thereof for opening said bypass passage and diverting air line air therethrough into said reservoir space.

8. A liquid mist generator comprising a liquid reservoir housing includes a reservoir chamber and a mixing chamber above said reservoir chamber; a passage member with inlet and outlet passageways communicating at all times only through said mixing chamber; air and liquid mixture means communicating with and interposed between said inlet passageway and said mixing chamber; air flow directing means for further mixing said air and liquid in said mixing chamber: liquid supply means for supplying liquid from the reservoir to said air and liquid mixture means; a valve means located proximate and upstream of said air and liquid mixture means and arranged to control the flow of air through said air and liquid mixture means; said valve means in one position permitting a limited continuous air flow through said mixture means; said valve means being actuated open in response to a predetermined air inlet pressure created by an increased volume of air flow through said inlet passageway permitting said increased volume of air to bypass said air and liquid mixture means but pass through said mixing chamber so as to be thoroughly mixed by said air flow directing means with the air and liquid mixed by said mixture means before flowing out said outlet passageway.

9. A liquid mist generator comprising a liquid reservoir, an air and liquid mixture means, a passage member with inlet and outlet passageways communicating through the air and liquid mixture means; liquid supply means for supplying liquid from the reservoir to said air and liquid mixture means; said air and liquid mixture means including a valve member having a central passageway therethrough and one end seated on and encompassing the inlet passageway for directing limited flow of air through said central passageway; said member being a reciprocally mounted sleeve having a flared throat encompassing the inlet passageway when closed and arranged concentric with the outlet of the supply means for drawing liquid through said supply means from said reservoir; said valve member being biased to seated position and reciprocally movable responsive to a predetermined air inlet pressure to unseat said one end from the inlet passageway permitting flow of air around said valve member; said mixture means including a mixing chamber in which said air passing through and around the valve member is mixed together previous to entering said outlet passageway; and a mixture-promoting, flow-directing means associated with said mixture chamber to assure proper mixing of all of said air with said liquid.

10. The device of claim 9 in which the throat of sleeve valve is arranged to move over the outlet of the supply means to cause the air flow area around said supply means to be variable as the sleeve valve is opened and closed thereby varying the mist entrainment volume with the varying air volume.

11. A liquid mist generator comprising a liquid reservoir; an air and liquid mixture means; a passage member with inlet and outlet passageways communicating through the air and liquid mixture means; liquid supply means for supplying liquid from the reservoir to said air and liquid mixture means; said air and liquid mixture means including a valve member having a central passageway therethrough and one end seated on and encompassing the inlet passageway for directing limited flow of air through said central passageway, said valve member being biased to seated position and reciprocally movable responsive to a predetermined air inlet pressure to unseat said one end from the inlet passageway permitting flow of air around said valve member; said mixture means including a first mixing chamber in which said air passing through and around the valve member is mixed together previous to entering said outlet passageway and a mixture-promoting, flow-directing means associated with said mixture chamber to assure proper mixing of all of said air with said liquid; bypass passageway concentrically encompassing said valve means, said valve means when open causing air to pass through said bypass passageway; a second mixing chamber communicating with but separate from the first mixing chamber and located between said first mixing chamber and said bypass passageway at the other end of said valve member opposite the end which seats over the inlet passageway; and a perforated insert support member mounted between the bypass passageway and said second mixing chamber for slidably supporting the valve element.

12. The device of claim 11 in which a collection chamber is provided below said mixing chamber, said collection chamber having exhaust openings for dispensing liquid collected therein.

References Cited in the file of this patent
UNITED STATES PATENTS

| | | |
|---|---|---|
| 2,718,934 | Norgren | Sept. 27, 1955 |
| 2,747,688 | Faust | May 29, 1956 |
| 2,762,457 | Anderson | Sept. 11, 1956 |
| 2,778,619 | Goodyer | Jan. 22, 1957 |
| 2,835,267 | Anderson | May 20, 1958 |
| 2,890,765 | Friedell | June 16, 1959 |